Feb. 18, 1930.   J. R. MAHAN   1,747,872

PUMP LUBRICATION SYSTEM

Filed March 5, 1929    2 Sheets-Sheet 1

INVENTOR
J. R. Mahan
by F. N. Barber
attorney

Feb. 18, 1930. J. R. MAHAN 1,747,872
PUMP LUBRICATION SYSTEM
Filed March 5, 1929  2 Sheets-Sheet 2
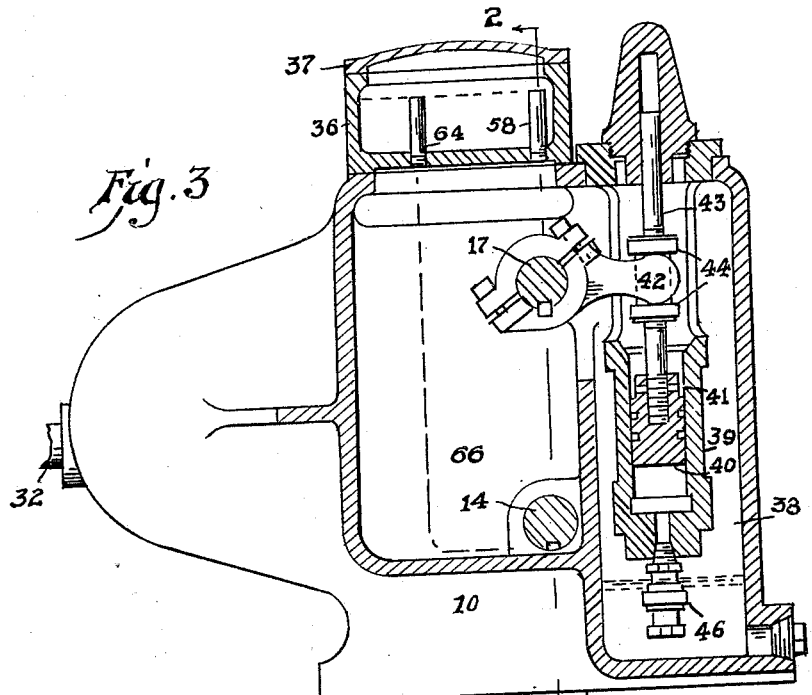
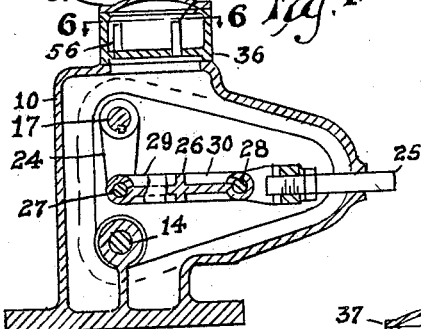
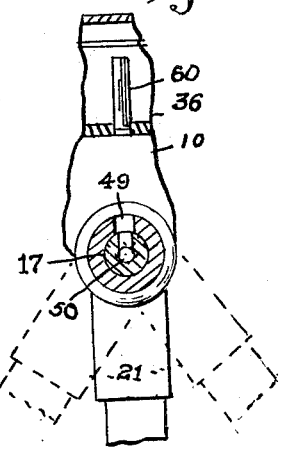
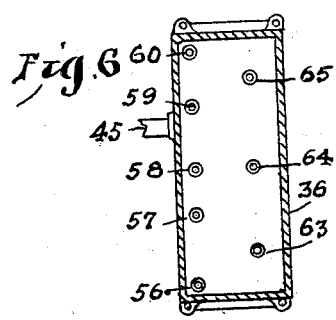
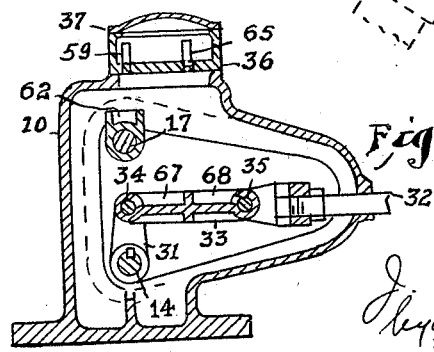
INVENTOR
J. R. Mahan Patented Feb. 18, 1930

1,747,872

UNITED STATES PATENT OFFICE

JOSEPH R. MAHAN, OF TOLEDO, OHIO, ASSIGNOR TO THE NATIONAL SUPPLY COMPANY, OF TOLEDO, OHIO, A CORPORATION OF OHIO

PUMP LUBRICATION SYSTEM

Application filed March 5, 1929. Serial No. 344,346.

My invention relates to lubricating systems for the valve operating mechanism of steam operated pumps.

One object of this invention is to inclose substantially all the valve operating mechanism in a closed casing from which dirt and the like are excluded.

Another object is to provide a lubricant reservoir to which lubricant is supplied by a pump operated by the valve operating mechanism and from which lubricant is supplied by gravity to the various bearings of the said mechanism. Another object is to provide a special course for the lubricant passing to the rocker-arm rollers. Other objects appear hereinafter.

Figure 1:
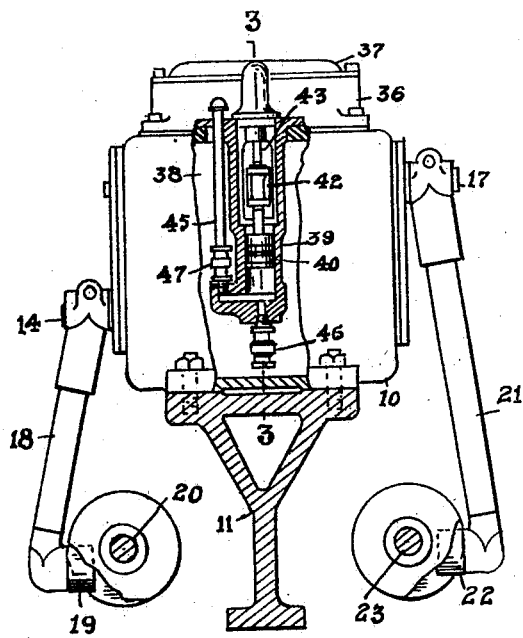
Figure 2:
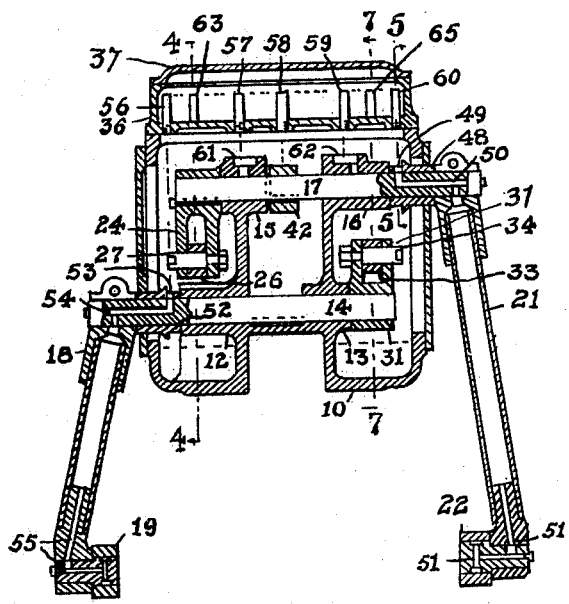

Referring to the accompanying drawings, Fig. 1 is a side elevation of a unit containing my invention, parts being in section and broken away; Fig. 2, a vertical section on the line 2—2 on Fig. 3; Fig. 3, a section on the line 3—3 on Fig. 1; Fig. 4, a section on the line 4—4 on Fig. 2; Fig. 5, a section on the line 5—5 on Fig. 2; Fig. 6, a section on the line 6—6 on Fig. 4; and Fig. 7, a section on the line 7—7 on Fig. 2.

On the drawings, 10 designates a casing supported by any suitable means such as the support 11 shown in Fig. 1 only. Within the casing are two horizontal bearings 12 and 13 for the rocker-shaft 14. Directly above the bearings 12 and 13 and within the casing are the two bearings 15 and 16 for the rocker shaft 17 which is parallel with the rocker-shaft 14. One end of the rocker-shaft 14 extends through one side of the casing 10. The portion of the shaft 14 which extends beyond the casing is provided with the hollow rocker-arm 18 having at its lower end the roller 19 which is operated by a piston-rod 20 to cause the rocker-arm 18 and the rocker-shaft 14 to oscillate in a manner well known.

The rocker-shaft 17 also projects through the casing 10 at the opposite side thereof from the side through which the shaft 14 projects. The rocker-shaft 17 carries beyond the casing the rocker-arm 21 having at its lower end the roller 22 which is operated by the piston-rod 23 to cause the rocker-shaft 17 and the rocker-arm 21 to oscillate in a well known manner.

The end of the rocker-shaft 17 nearest the rocker-arm 18 has the pendent crank 24 to which the valve-rod 25 is connected by means of the link 26 connected at one end to the crank 24 by the pivot 27 and at the other end to the valve-rod 25 by the pivot 28. The upper surface of the link 26 has therein two reservoirs 29 and 30, one at each end of the link. These reservoirs communicate with the pivots 27 and 28 through small passages in the ends of the links.

The end of the rocker-shaft 14 is provided with an upstanding crank 31 to which the valve-rod 32 is connected by the link 33 pivotally connected to the crank and the valve-rod 32 by the pivots 34 and 35.

The top of the casing 10 is closed by the reservoir 36 whose upper end is closed by the cap 37.

Within the casing 10 is the chamber 38 containing the vertical pump 39. The piston 40 of the pump is reciprocated in the pump barrel 41 by means of the crank-arm 42 attached to the rocker-shaft 17. The outer end of the crank-arm 42 receives the piston-rod 43 which carries two friction disks 44 for engagement with the upper and lower sides of the crank-arm. When the piston rises it sucks lubricant from the sump or reservoir in the lower end of the chamber 38. When the piston descends it forces oil from the pump barrel below the piston up through the outlet pipe 45 and into the reservoir 36. 46 is a check-valve preventing lubricant from returning to the sump after it has been sucked into the pump barrel, and 47 is a check-valve to prevent lubricant from returning to the pump barrel after it has passed up the pipe 45.

The shaft 17 is provided with the sleeve 48 which is non-rotative in the opening through which the shaft extends. The sleeve has in its upper side and within the casing a port 49 which communicates with a passage 50 in the shaft 17, this passage opening into the upper end of the hollow rocker-arm 21. The lower end of the rocker-arm 21 has connected passages 51 terminating opposite the inner wall of the roller 22. When the rocker-arm 21 is in neutral or central position the port 49 and the inlet end of the passage 50 are in registry, but when the rocker-arm is at either limit of its stroke the inlet end of the passage 50 is out of registry with the port 49.

A sleeve 52 is fitted around the rocker-shaft 14 and in the opening in the casing 10. This sleeve has on its upper side a port 53 registering with the inlet end of the passage 54 which lies in the shaft 14 and has its delivery end opening into the hollow rocker-arm 18. The lower end of the rocker-arm has passage 55 having its outlets opposite the inner surface of the roller 19. When the rocker-arm 18 is in its middle position the inlet end of passage 54 registers with the port 53, but when the rocker-arm is at either extreme the inlet end of the passage 54 is out of registry with the port 53.

The reservoir 36 has in the plane of the section line 2—2 on Fig. 3 five vertical tubes 56, 57, 58, 59, and 60 screwed into the bottom of the reservoir. When the mechanism shown is in operation the pump 39 supplies lubricant to the reservoir 36. The lubricant overflows into the upper ends of the said tubes, lubricant from the tube 56 dropping into the port 53; from the tube 57, into the cup 61 from which lubricant is supplied to one end of the shaft 17; from the tube 58, onto the arm 42 and thence to friction disks 44; from the tube 59 into the cup 62 from which lubricant flows to the other end of the shaft 17; and from the tube 60 into the port 49. Lubricant from the tube 56 flows intermittently, as the rocker-arm 18 oscillates, through the passage 54, the rocker-arm and the passage 55 therein, to the bearing surfaces of the roller 19. Lubricant also flows intermittently from the tube 60 through the port 49 and the passage 50 and the rocker-arm 21 including passage 51 therein, to the bearing surfaces of the roller 22.

The reservoir 36 has screwed into its bottom three other overflow tubes 63, 64 and 65 which lie to the left of the row of tubes 56 to 60 on Fig. 3 and beyond the tubes 56 to 60 on Fig. 2. The overflow of lubricant from the tube 63 drops alternately into the reservoirs 29 and 30 of the link 26 as the link reciprocates. The overflow from the tube 64 flows into the chamber 66 and thence into the chamber 38. The overflow from the tube 65 supplies lubricant to the reservoir 67 and 68 on the upper surface of the link 33 from which lubricant is fed to the pivots 34 and 35 through ports in the ends of the link.

I claim:

1. In a valve controlling mechanism for steam operated pumps, a piston rod, a valve-operating rod, and oscillatory mechanism actuated by the piston rod and actuating the said rod, a lubricant reservoir, a pump, means actuated by the said mechanism for operating the pump, means for delivering lubricant from the pump to the reservoir, and means for distributing lubricant from the reservoir to the bearings of the mechanism.

2. In a valve controlling mechanism for steam operated pumps, a rocker-shaft, a piston rod, connections between the rocker-shaft and the piston rod for rocking the rocker shaft, a valve operating rod, connections between the rocker-shaft and the valve operating rod for reciprocating the latter, a lubricant reservoir, a pump, means for delivering lubricant from the pump to the reservoir, connections between the pump and the rocker-shaft for operating the pump, and means for delivering lubricant from the reservoir to the bearings of the valve controlling mechanism.

3. In a valve operating mechanism for steam operated pumps, a rocker-shaft, a rocker-arm for rocking the rocker-shaft, a piston rod, operating connections between the piston-rod and the rocker-arm, a lubricant reservoir, a pump, means operated by the said mechanism for actuating the pump, means for delivering lubricant from the pump to the reservoir, a lubricant passage along the rocker-arm for leading lubricant to the said connection, and a passage in the rocker-shaft having one end arranged to receive lubricant from the reservoir and the other end arranged to deliver lubricant to the first named passage.

4. In a valve operating mechanism for steam operated pumps, a rocker-shaft, a rocker-arm for rocking the rocker-shaft, a piston-rod, operating connections between the piston-rod and the rocker-arm, a lubricant reservoir, a pump, means operated by the said mechanism for actuating the pump, means for delivering lubricant from the pump to the reservoir, a lubricant passage along the rocker-arm for leading lubricant to the said connection, a sleeve surrounding the shaft and having a port to receive lubricant from the reservoir, and a passage in the rocker-arm to deliver lubricant from the said port to the said first passage, the port and the inlet of the passage in the rocker-arm being in registry for only a portion of the rocking periods of the rocker-shaft.

5. In a valve operating mechanism for steam operated pumps, a rocker-shaft, a piston-rod for rocking the same, a reciprocating valve-rod operated by the rocker-shaft, a horizontal link having pivotal connections to the rocker-shaft and the valve-rod, a lubricant reservoir, lubricating collecting means in the link to receive lubricant from the reservoir and passages leading lubricant from the said means to the said pivotal connections.

6. In a valve operating mechanism for steam operated pumps, a rocker-shaft, a rocker-arm for rocking the rocker-shaft, a piston rod, operating connections between the piston-rod and the rocker-arm, a lubricant reservoir, a pump, means operated by the said mechanism for actuating the pump, means for delivering lubricant from the pump to the reservoir, a lubricant passage along the rocker-arm for leading lubricant to the said connection, a passage in the rocker-shaft having one end arranged to receive lubricant from the reservoir and the other end arranged to deliver lubricant to the first named passage, and a casing inclosing the rocker-shaft, a portion of the piston-rod, the said connections, the said pump and the said means.

In testimony whereof, I hereunto affix my signature.

JOSEPH R. MAHAN.